(12) United States Patent
Maas et al.

(10) Patent No.: US 9,664,098 B2
(45) Date of Patent: May 30, 2017

(54) EXHAUST-GAS TURBOCHARGER WITH SILENCER

(75) Inventors: Ulrich Maas, Eppelsheim (DE); Norbert Walter, Ludwigshafen (DE)

(73) Assignee: BorgWarner Inc., Auburn Hills, MI (US)

( * ) Notice: Subject to any disclaimer, the term of this patent is extended or adjusted under 35 U.S.C. 154(b) by 823 days.

(21) Appl. No.: 13/813,169

(22) PCT Filed: Aug. 4, 2011

(86) PCT No.: PCT/US2011/046528
§ 371 (c)(1),
(2), (4) Date: Jan. 30, 2013

(87) PCT Pub. No.: WO2012/021361
PCT Pub. Date: Feb. 16, 2012

(65) Prior Publication Data
US 2013/0129492 A1    May 23, 2013

(30) Foreign Application Priority Data
Aug. 11, 2010   (DE) .......................... 10 2010 033 966

(51) Int. Cl.
*F01D 25/24*    (2006.01)
*F02M 35/12*    (2006.01)
(Continued)

(52) U.S. Cl.
CPC ........... *F01N 13/007* (2013.01); *F01D 25/24* (2013.01); *F02C 6/12* (2013.01); *F02M 35/12* (2013.01); *F02M 35/1233* (2013.01); *F02M 35/1266* (2013.01); *F04D 29/664* (2013.01); *F01N 2340/06* (2013.01); *F02B 39/00* (2013.01); *F02M 35/1272* (2013.01); *F05D 2220/40* (2013.01); *F05D 2250/141* (2013.01);
(Continued)

(58) Field of Classification Search
CPC . F01D 25/24; F02B 39/00; F02C 6/12; F02M 35/12; F02M 35/1233; F02M 35/1266; F02M 35/1272; F05D 2250/141; F05D 2250/192; F05D 2250/71; F05D 2260/96; F05D 2220/40; F05D 2250/51; F05D 2250/52; F04D 29/664; F01N 13/007; F01N 2340/06
See application file for complete search history.

(56) References Cited

U.S. PATENT DOCUMENTS 4,969,536 A * 11/1990 Allen ................. F02M 35/1216
                                            181/225
8,453,790 B1 * 6/2013 Oliver ................... F24F 1/0007
                                            181/224
(Continued)

*Primary Examiner* — Dominick L Plakkoottam
(74) *Attorney, Agent, or Firm* — Eric L. Doyle; Stephan A. Pendorf; Patent Central LLC

(57) ABSTRACT

A turbocharger (1) having a turbine housing (2), a compressor housing (3) which has a compressor outlet (20), and a silencer (21) which is arranged on an end region (22) on the compressor outlet (20) and which has a silencer housing (23) in which an insert part (25) is arranged so as to form at least one buffer chamber (24) which is connected via at least one opening (26) to an air-guiding duct (27). The opening (26) has an edge (28) with a radially inner corner (29) which is designed so as not to have a sharp edge.

16 Claims, 2 Drawing Sheets

(51) Int. Cl.
*F01N 13/00* (2010.01)
*F04D 29/66* (2006.01)
*F02C 6/12* (2006.01)
*F02B 39/00* (2006.01)

(52) U.S. Cl.
CPC .... *F05D 2250/192* (2013.01); *F05D 2250/71* (2013.01); *F05D 2260/96* (2013.01)

(56) References Cited

U.S. PATENT DOCUMENTS

| | | |
|---|---|---|
| 2002/0070075 A1 | 6/2002 | Lepoutre |
| 2008/0118377 A1* | 5/2008 | Ante .................. F01D 17/06 417/407 |
| 2008/0135328 A1* | 6/2008 | Takeda ................. E01F 8/0094 181/206 |
| 2008/0286127 A1 | 11/2008 | Gaude et al. |
| 2011/0073406 A1* | 3/2011 | Ortman .................. F02B 33/44 181/276 |

\* cited by examiner

EXHAUST-GAS TURBOCHARGER WITH SILENCER

BACKGROUND OF THE INVENTION

Field of the Invention

The invention relates to a turbocharger with a silencer.

Description of the Related Art

A turbocharger of said type is known from DE 10 2006 038 830 A1. Said turbocharger has a silencer in order to be able to at least lessen the occurrence of acoustic disturbances which can occur as a result of high-frequency flow noises, which may be caused for example by geometric irregularities. In unfavorable inflow situations, however, very noticeable tones can be generated by the silencer itself. A conventional silencer is composed of an air-guiding duct which is traversed by flow and to which hydraulic buffer chambers or ducts for producing buffer volumes can be coupled. The connecting points between the air-guiding duct and the buffer chambers or the ducts have a considerable thickness and sharp edges, in particular in the case of injection-molded parts. Said noticeable tones can therefore be generated by the silencer itself at the sharp edges.

It is therefore an object of the present invention to provide a turbocharger by means of which it is possible to reduce or completely eliminate tones generated by the silencer.

BRIEF SUMMARY OF THE INVENTION

By eliminating a sharp-edged radially inner corner, it is possible for the generation of noticeable tones by the silencer itself to be prevented without impairing the actual function of the silencer.

The radially inner corner of the edge of the opening from the air-guiding duct to the buffer chamber may be formed for example as a rounding, as a bevel or as an inwardly directed bulge.

Here, tests carried out within the context of the invention have yielded that, surprisingly, simply machining said radially inner edge makes it possible to effectively suppress the tone generation by the silencer itself.

BRIEF DESCRIPTION OF THE SEVERAL VIEWS OF THE DRAWINGS

Further details, advantages and features of the present invention will emerge from the following description of exemplary embodiments on the basis of the drawing, in which.

DETAILED DESCRIPTION OF THE INVENTION

Figure 1:
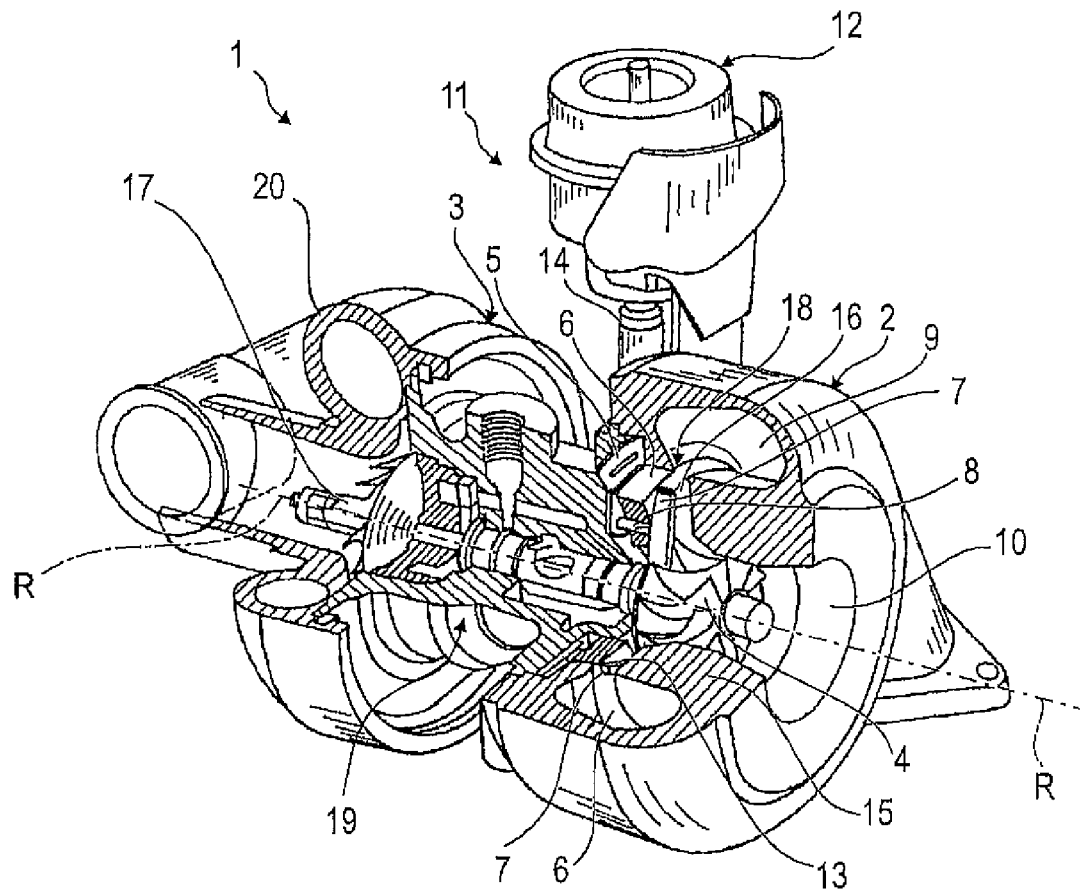
FIG. 1 shows a perspective illustration of an embodiment of a turbocharger according to the invention which can be provided with a silencer according to the invention.

FIG. 1 shows an embodiment of a turbocharger 1 according to the invention which has a turbine with a turbine housing 2 and has a compressor with a compressor housing 3. The compressor housing has a compressor outlet 20 to which can be attached a silencer which will be explained in detail below on the basis of the diagrammatic illustration of FIGS. 2 to 5.

All the other components of the turbocharger 1 illustrated by way of example will not be described in detail below because they are not required for explaining the principles of the present invention. For the explanation of the reference symbols used in FIG. 1, however, reference is made to the list of reference symbols.

Figure 2:
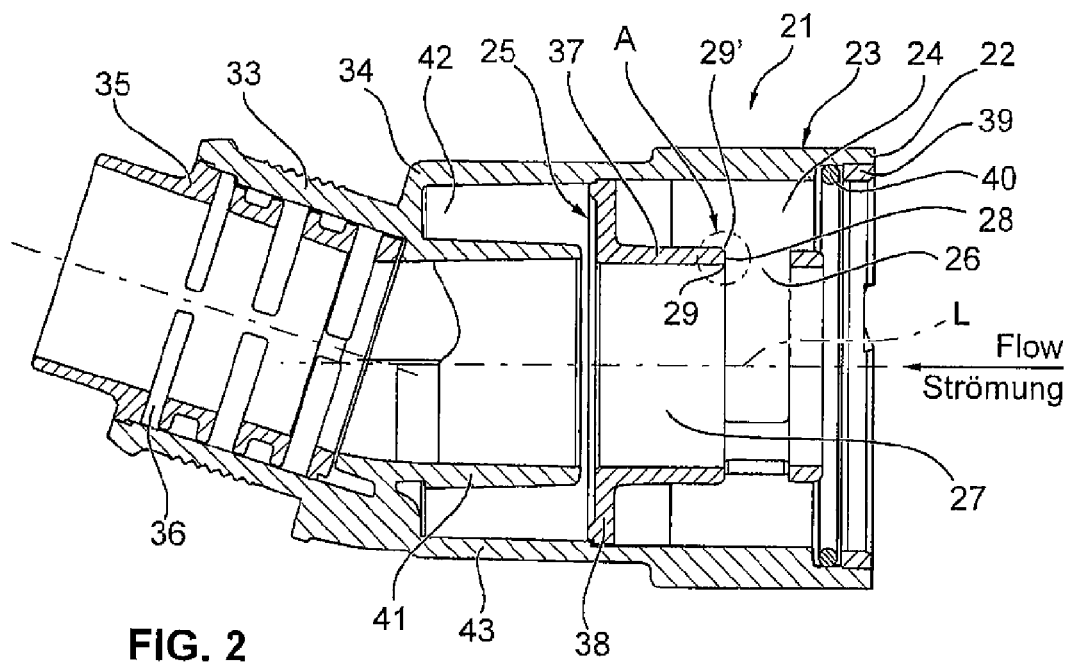
FIG. 2 shows a longitudinal section through a silencer according to the invention which can be combined with the turbocharger according to FIG. 1, and FIGS. 3-5 show detailed illustrations A-1 to A-3 of embodiments of a radially inner machined corner of an opening of the silencer according to the invention.

FIG. 2 illustrates a longitudinal section through a silencer 21 according to the invention, which silencer has a silencer housing 23 provided with a first end region 22 which can be attached in a suitable manner, for example screwed, to the compressor outlet 20.

Arranged in the silencer housing 23 is an insert part 25 which has a tubular base part 37 which is provided with a spacer 38, which in the example is in the shape of a disk, for forming a buffer chamber 24. The insert part 25 may be fixed in the silencer housing 23 by means of a suitable retaining device 39 with the interposition of a sealing ring 40. The base part 37 is provided at least with one opening, but generally with two or three openings 26, which connect an air-guiding duct 27 arranged in the base part 37 to the buffer chamber 24.

The opening 26 has an edge 28 which is provided with a radially inner corner 29. The edge 28 also has a radially outer corner 29', wherein FIG. 2 shows that the radially inner corner 29 is to be understood to mean the corner which is arranged closer to the longitudinal central line L of the silencer housing 23 than the radially outer corner 29'.

As is also shown in FIG. 2, the silencer housing 23 in the example has an integrally formed inner pipe piece 41 which, together with an outer wall 43, forms a further buffer chamber 42.

Furthermore, the silencer housing 23 is provided, on its other end region 34, with a connecting piece 33 in which, in the example, a further insert part 35 with slots is arranged, one of which slots is denoted, representatively for all of the slots, by the reference numeral 36. Said insert part 35 likewise serves as a silencer. A line to the charge-air cooler, if one is provided, or to the engine may be connected to the connecting piece 33.

Figure 3:
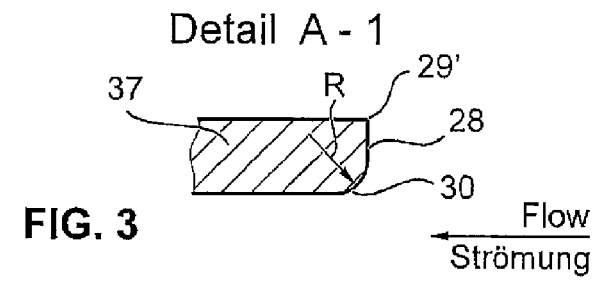
Figure 4:
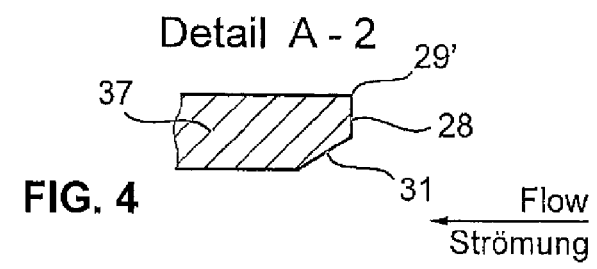
Figure 5:
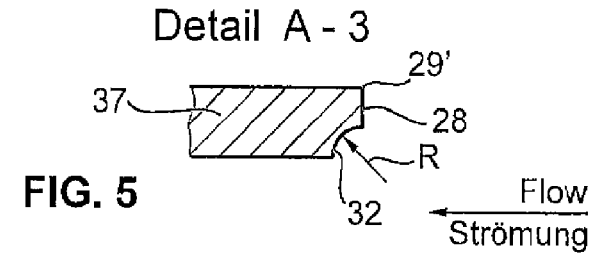

To be able to prevent the generation of disturbance noises by the silencer 21 itself, the radially inner corner 29 thereof is machined in order to eliminate a sharp-edged design. FIGS. 3 to 5 show alternatives of the detail denoted in FIG. 1 by the letter A.

FIG. 3 shows a rounding 30 of the radially inner corner 29, which rounding is provided with a selectable radius R. As shown in FIG. 3, the rounding 30 in this example points outward.

FIG. 4 shows, as a detail A-2, a bevel 31 of the radially inner corner 29.

FIG. 5 shows the detail A-3, wherein in this case, an inwardly directed bulge 32 of the radially inner corner 29 is provided, which likewise has a selectable radius R.

All of said designs can prevent the occurrence of disturbance noises, since the sharp edge of the radially inner corner 29 of the edge 28 is eliminated.

In addition to the above written disclosure of the invention, reference is hereby made explicitly to the diagrammatic illustration thereof in FIGS. 1 to 5.

LIST OF REFERENCE SYMBOLS

1 Turbocharger/exhaust-gas turbocharger
2 Turbine housing/turbine

3 Compressor housing/compressor
4 Turbine wheel
5 Adjusting ring
6 Blade bearing ring
7 Guide blades
8 Blade shaft
9 Supply duct
10 Axial connecting piece
11 Actuating device
12 Control capsule
13 Free space for guide blades 7
14 Plunger element
15 Annular part of the turbine housing 2
16 Spacer/spacer cam
17 Compressor wheel
18 Guide grate/guide apparatus
19 Bearing housing
20 Compressor outlet
21 Silencer
22 First end region
23 Silencer housing
24 Buffer chamber/buffer volume
25 Insert part
26 Opening
27 Air-guiding duct
28 Edge
29 Radially inner corner
29' Radially outer corner
30 Rounding
31 Bevel
32 Bulge
33 Connecting piece
34 Second end region
35 Insert part
36 Slot
37 Base part
38 Spacer
39 Retaining device
40 Sealing ring
41 Pipe piece
42 Buffer chamber
43 Outer wall
L Longitudinal central line of the silencer housing 23
R Radius

The invention claimed is:

1. A turbocharger (1) having
a turbine housing (2),
a compressor housing (3) which has a compressor outlet (20), and
a silencer (21) having
an inflow end (22) and an outflow end, the inflow end (22) being arranged on the compressor outlet (20) and
a silencer housing (23) in which an insert part (25) is arranged, the insert part (25) having a tubular base part (37) having a wall having a radially outer surface and a radially inner surface, the tubular base part arranged so as to form (a) with its radially outer surface at least one buffer chamber (24) between the silencer housing (23) and the tubular base part (37) and (b) with its radially inner surface an air-guiding duct (27) defining an air-guiding space within the tubular base part (37),
wherein at least one opening (26) is formed through the wall of the tubular base part (37), communicating between the buffer chamber (24) and the air-guiding duct (27), the opening having an edge (28) with a radially inner corner (29), and
wherein the radially inner corner (29) is not a sharp corner thereby reducing or eliminating tones generated at the at least one opening (26) as air flows by the silencer.

2. The turbocharger as claimed in claim 1, wherein the corner (29) is provided with a rounding (30).

3. The turbocharger as claimed in claim 1, wherein the corner (29) is provided with a bevel (31).

4. The turbocharger as claimed in claim 1, wherein the corner (29) is provided with an inwardly directed bulge (32).

5. The turbocharger as claimed in claim 1, wherein the silencer housing (23) has an end region (34), and a connecting piece (33) on the end region (34).

6. The turbocharger as claimed in claim 5, wherein a further insert part (35) is arranged in the connecting piece (33).

7. The turbocharger as claimed in claim 6, wherein the further insert part (35) is provided with slots (36).

8. The turbocharger as claimed in claim 1, wherein the silencer housing (23) is a plastic part.

9. A silencer (21) of a turbocharger (1), comprising
an inflow end (22) and an outflow end, the inflow end (22) being arranged on a compressor outlet (20) and
a silencer housing (23) in which an insert part (25) is arranged, the insert part (25) having a tubular base part (37) having a wall having a radially outer surface and a radially inner surface, the tubular base part arranged so as to form (a) with its radially outer surface at least one buffer chamber (24) between the silencer housing (23) and the tubular base part (37) and (b) with its radially inner surface an air-guiding duct (27) defining an air-guiding space within the tubular base part (37),
wherein at least one opening (26) is formed through the wall of the tubular base part (37), communicating between the buffer chamber (24) and the air-guiding duct (27), the opening having an edge (28) with a radially inner corner (29), and
wherein the radially inner corner (29) is not a sharp corner thereby reducing or eliminating tones generated at the at least one opening (26) as air flows by the silencer.

10. The silencer as claimed in claim 9, wherein the corner (29) is provided with a rounding (30).

11. The silencer as claimed in claim 9, wherein the corner (29) is provided with a bevel (31).

12. The silencer as claimed in claim 9, wherein the corner (29) is provided with an inwardly directed bulge (32).

13. The silencer as claimed in claim 9, wherein the silencer housing (23) has an end region (34), and a connecting piece (33) on the end region (34).

14. The silencer as claimed in claim 13, wherein a further insert part (35) is arranged in the connecting piece (33).

15. The silencer as claimed in claim 14, wherein the further insert part (35) is provided with slots (36).

16. The silencer as claimed in claim 9, wherein the silencer housing (23) is a plastic part.

* * * * *